United States Patent
Gnauck et al.

(10) Patent No.: US 6,339,487 B1
(45) Date of Patent: Jan. 15, 2002

(54) BI-DIRECTIONAL OPTICAL TRANSMISSION SYSTEM

(75) Inventors: Alan H. Gnauck, Middletown; Xiaolin Lu, Matawan; Sheryl Leigh Woodward, Holmdel, all of NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 08/823,398

(22) Filed: Mar. 24, 1997

(51) Int. Cl.$^7$ .......................... H04J 14/02; H04J 14/04
(52) U.S. Cl. ...................... 359/114; 359/133; 359/161
(58) Field of Search ............................. 359/113, 114, 359/124, 125, 133, 134, 161, 173, 152, 153

(56) References Cited

U.S. PATENT DOCUMENTS

| | | | |
|---|---|---|---|
| 5,050,952 A | 9/1991 | Fussgager .................. | 359/114 |
| 5,267,074 A | 11/1993 | Klumitmans et al. ....... | 359/191 |
| 5,311,344 A | 5/1994 | Gohn ......................... | 359/125 |
| 5,371,622 A | 12/1994 | Khoe et al. ................. | 359/114 |
| 5,430,568 A | 7/1995 | Little et al. ................. | 359/124 |
| 5,450,510 A | 9/1995 | Boord et al. ................ | 359/114 |
| 5,541,758 A | 7/1996 | Matsuo et al. .............. | 359/133 |

OTHER PUBLICATIONS

Antoniades, et al., Use od Subcarrier Multiplexing/Multiple Access for Multiponit Connections in All–Optical Networks, All–Optical Communications Systems: Architecture, Control, and Network Issues, Philadelphia, PA USA, 2614:218–228, Oct. 1995, Proceedings of the SPIE –The International Society for Optical Engineering, 1995, SPIE-Int. Soc. Opt. Eng, USA.

Wen–Plao, Lin, A Cost–Effective Passive Optical Network Based on Multiple–Optical–Subcarrier Multplexing, Microwave and Optical Technology Letters, 12(5):277–279, Aug. 5, 1996.

"Simple In–Line Bi Directional 1.5 $\mu$M/1.3$\mu$M Tranceivers", T. L. Koch, et al., IEEE International Semiconductor Laser Conference, (Digest), 1990, pp. 166–167.

"Observation of Coherent Rayleigh Noise in Single–Source Bidirectional Optical Fiber System", Thomas H. Wood et al., J. of Lightwave Technology, vol. 6, No. 2, Feb. 1988, pp. 346–352.

"Reduction of Optical–Beat Interference in Subcarrier Networks", S. L. Woodward, et al., IEEE Photonics Technology Letters, vol. 8, No. 5, May 1966, pp. 694–696.

"Subcarrier Multiplexing for Multiple–Access Lightwave Networks", T. E. Darcie, J. of Lightwave Technology, vol. Lt–5, No. 8, Aug. 1987, pp. 1103–1110.

"Optical Full–Duplex Transmission with Diode Laser Amplifiers", Peter A. Andrekson et al., J. of Lightwave Technology, vol. 9, No. 6, Jun. 1991, pp. 737–740.

"Operation of Passive Optical Network with Subcarrier Multiplexing in the Presence of Optical Beat Interference", T. H. Wood et al., J. of Lightwave Technology, vol. 11, No. 10, Oct. 1993, pp. 1632–1640.

"Optical Interference in Lightwave Subcarrier Multiplexing Systems Employing Multiple Optical Carriers", Electronics Letters, vol. 24, No. 1, Jan. 7, 1988, pp. 50–52.

*Primary Examiner*—Leslie Pascal
(74) *Attorney, Agent, or Firm*—Kenyon & Kenyon

(57) ABSTRACT

A bi-directional optical transmission system provides communications between at least two locations over a single optical fiber. The transmitters at the respective locations are defined to have different optical spectra characteristics to avoid production of optical beat interference.

10 Claims, 3 Drawing Sheets

BI-DIRECTIONAL OPTICAL TRANSMISSION SYSTEM

BACKGROUND OF THE INVENTION

The present invention is directed to an optical transmission system. More specifically, the present invention is directed to a bidirectional optical transmission system in which sub-carrier multiplexing is employed.

It is known how to provide bi-directional communication systems in the optical fiber environment. An example of one such known configuration is illustrated in FIG. 1. In this configuration, "bi-direction" refers to the fact that information can be sent between point A and point B in either direction. However, the system actually consists of two uni-directional transmission systems combined together. In particular, a first optical fiber 120 carries information from transmitter 130 at location B to receiver 100 at location A. This first uni-directional transmission system is combined with a second uni-directional transmission system that employs a second optical fiber 121 to carry transmissions from transmitter 110 at location A to receiver 131 at location B. The obvious problem with this configuration is the need for two separate optical fibers to carry the information between points A and B. It is desirable to provide information between the locations over a single optical fiber if possible.

It is also known in the prior art how to provide bi-directional transmission over a single optical fiber using only one laser transmitter ("Observation of Coherent Rayleigh Noise in Single-Source Bidirectional Optical Fiber Systems", Wood et al., Journal of Lightwave Technology, Vol. 6, No. 2, February 1988). An example of this configuration is illustrated in FIG. 2A. Here, a laser transmitter 200 and a receiver 210 are positioned at location C. The laser transmitter transmits an optical signal over optical fiber 220 to a second location D. Modulator/receiver 230 receives the information signal from the optical fiber 220 and then modulates the carrier signal received and sends it back along the same optical fiber 220. A splitter 240 then permits a receiver 210 at location C to receive the modulated returned optical carrier that contains information being transmitted from location D. Thus, there is "transmission" from both locations over a single optical fiber. However, only a single laser transmitter is provided and hence, all of the communications that occur over the optical fiber rely upon the same optical carrier.

It is also known how to provide a sub-carrier multiplexed transmission to create multiple channels with a single optical carrier. Such a configuration is described in "Sub-carrier Multiplexing for Multi-Access Light Wave Networks" by T. E. Darcie Journal of Light Wave Technology, Volume LT-5 No. 8, Aug. 18, 1987, pages 1103–1110. The article describes a network that increases the usage of an optical fiber transmission system. As described, it is possible to modulate an optical carrier signal with one or more microwave frequency subcarriers, each of which can carry unique data. As the article describes, each access point in a network could be assigned its own subcarrier channel for communication, and be capable of transmitting at that sub-carrier microwave frequency or receiving at that subcarrier frequency. When transmitting from a central location to many users as shown in FIG. 2B multiple sub-carriers $f_1$ to $f_N$ can be modulated onto a single optical carrier $\lambda_1$ at transmitter 205, thereby expanding the capacity of the optical fiber to serve multiple access points. Each receiver $235_1$ to $235_N$ is adapted to receive information from one of the N sub-carriers. Also, each transmitter $250_1$ to $250_N$ transmits back to receiver 215 using a sub-carrier frequency. When transmitting from the users to the central receiver 215 a phenomenon known as "optical beat-interference" can cause severe system impairments (as described in "Optical Interference in Light Wave Subcarrier Multiplexing Systems employing Multiple Optical Carriers." By C. Desem, Electronics Letters, 7th January, 1988, Volume 24 No. 1, pages 50–52).

In one proposed bidirectional transmission system it has been discovered that optical beat interference exists even when the same optical carrier is not used in both directions.

In view of this optical interference problem and the short comings of the prior art systems, it is desirable to provide a truly bi-directional transmission system over single optical fiber which avoids the problem of optical beat interference.

SUMMARY OF THE INVENTION

The present invention provides the desired bi-directional transmission system. The present invention achieves the bi-directional transmission capability with reduction or avoidance of optical beat interference by providing a unique combination of transmitters and receivers at the access points of the network.

In accordance with an embodiment of the present invention, the transmitters at two different locations along the single optical fiber produce transmission signals in accordance with two different optical spectra. The optical spectral characteristics for the two transmitters are selected so as to assure that the wavelength of the optical carriers are different during the operation of the system. This avoids the production of optical beat interference. The selection is made so as to assure that even as the wavelength of the transmitters may vary based on certain stimuli such as temperature (such variation also being referred to as drift), the wavelengths will have a very low probability of overlapping thereby insuring a reduction or avoidance of optical beat interference.

In one of the embodiments the optical carriers for the two transmitters are specifically selected to have optical frequencies which differ by more than the maximum frequency employed as a sub-carrier (fmaxsc). The optical carrier's wavelength is equal to the speed of light "c" divided by the optical frequency f ($\lambda=c/f$). Therefore, this sets a specification on how the wavelengths of the optical carriers must differ ($|\Delta\lambda|=\Delta f/C\ \lambda^2$). This requirement must be increased to account for the laser linewidth (variations in the optical frequency due to noise), chirp (variations in the optical frequency due to modulation of the optical carrier), and drift. Temperature controllers could be provided with these transmitters so as to stabilize the lasers to avoid drift. However, if the wavelength difference is sufficient, then even without temperature control the effects of optical beat interference should be minimized.

In a multiple frequency laser (also known as a multimode laser), such a Fabry-Perot laser, the optical carriers must be selected so that each optical frequency of one carrier differs from all of the optical frequencies of the other carrier by $f_{maxsc}$.

In another embodiment the characteristics of the optical spectra differ in that the mode spacing (the difference in wavelength between two frequencies of one multiple frequency laser) of the two lasers differ sufficiently that even with drift the optical spectra of the two lasers will never coincide at all of the optical frequencies. This difference in mode spacing can be achieved either by using two Fabry- Perot lasers of different lengths or by employing a Fabry-Perot laser and a single frequency laser such as a distributed feedback laser.

By selecting the optical spectral characteristics of the two transmitters to differ sufficiently, the present invention assures that bi-directional transmission in the sub-carrier multiplexing environment is attainable.

Further details regarding the invention will be described below.

DETAILED DESCRIPTION

Figure 3:
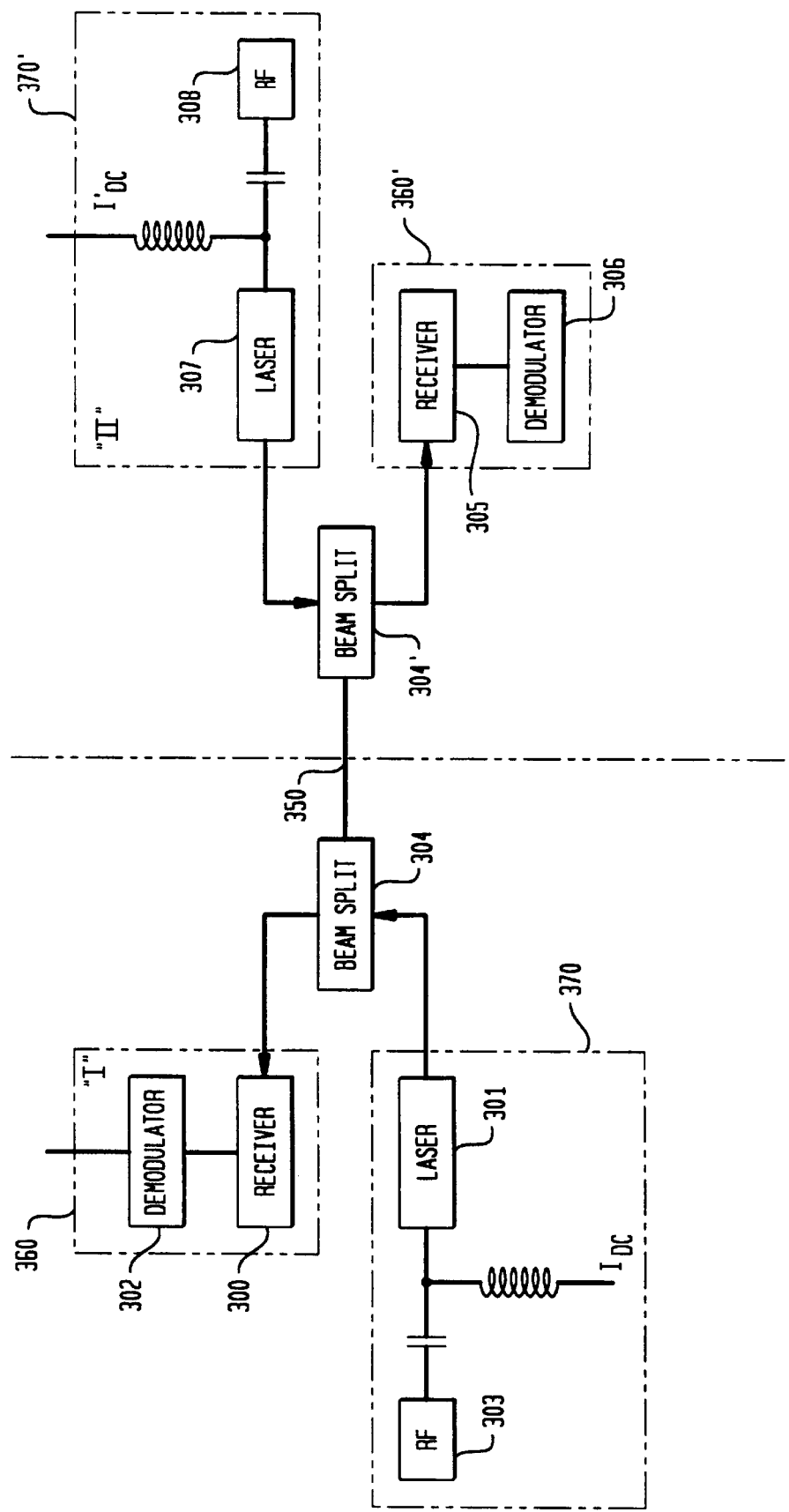
FIG. 3 illustrates an embodiment of the present invention.

An embodiment of a bi-directional optical transmission system in accordance with the present invention is illustrated in FIG. 3. Two locations "I" and "II" are coupled together via a single optical fiber 350. In general terms, each of the locations contains essentially the same equipment, however, the differences and distinctions between the locations will be described.

At location I there is a first transceiver which includes a transmitter 370 and a receiver module 360. The transmitter 370 includes a RF (radio frequency) source 303 and a DC source represented by Idc. To transmit data RF sub-carriers are modulated. The DC source insures that the laser is on, i.e., is emitting light, so that an optical carrier is present. The RF signals modulate the optical carrier produced by laser 301. This provides a sub-carrier multiplexed signal. As shown in FIG. 3, this transmitter can be a directly modulated laser that provides one or more RF sub-carriers on the optical carrier. Alternatively, it instead can be a transmitter that includes a laser that first produces an optical carrier signal and an optical modulator placed downstream of the laser which modulates the optical carrier with sub-carrier signals. The receiver module 360 includes an optical receiver 300 for optical-to-electrical conversion. This sends the appropriate electrical signal to the demodulator 302 which can discern the appropriate sub-carrier(s) from the received signal and produce the appropriate corresponding electrical information. A beam splitting device 304 couples the receiver module 360 and the transmitter 370 to the optical fiber 350. As a consequence, the transmission signal from the transmitter 370 is sent to the location II via the beam splitter 304 and the optical fiber 350 while the receiver module 360 receives the signal sent by location II via the beam splitter 304' and optical fiber 350.

The transceiver at location II consists of similar components. In particular, transmitter 370' includes a laser 307, RF source 308, and DC source. This transmitter provides a subcarrier multiplexed optical signal to beam splitter 304' for transmission along optical fiber 350. Also the beam splitter 304' receives the signal produced by location I and provides it to optical receiver 305 which then converts the optical signal to an electrical one for processing by demodulator 306 in a receiver module 360'.

The present inventors discovered that if the lasers 301 and 307 provide optical carrier signals of the same wavelength then the phenomenon referred to as optical beat interference may occur and thereby degrade the performance of the bi-directional transmission system. Optical beat interference has been studied in systems where the optical carriers are of comparable strength such as that depicted in FIG. 2B. It has also been studied in bidirectional systems such as that depicted in FIG. 2A. The bidirectional system of the present invention differs from these known systems.

Figure 1:
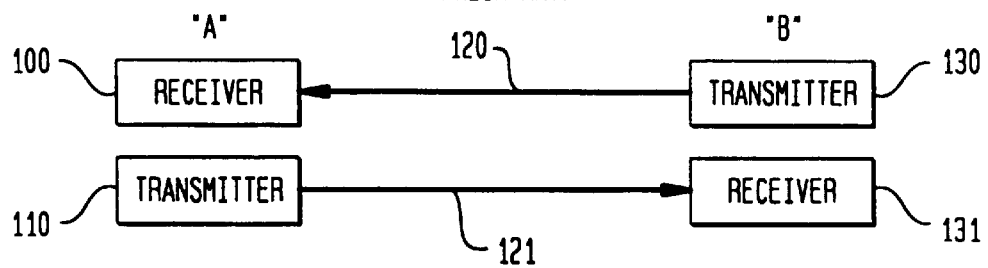
FIG. 1 illustrates a prior art bi-directional two-optical fiber configuration.
Figure 2A:
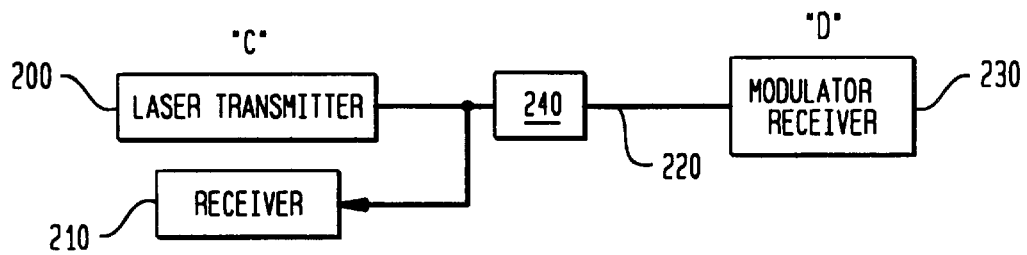
FIG. 2A illustrates a prior art bi-directional transmission system over a single optical fiber.
Figure 2B:
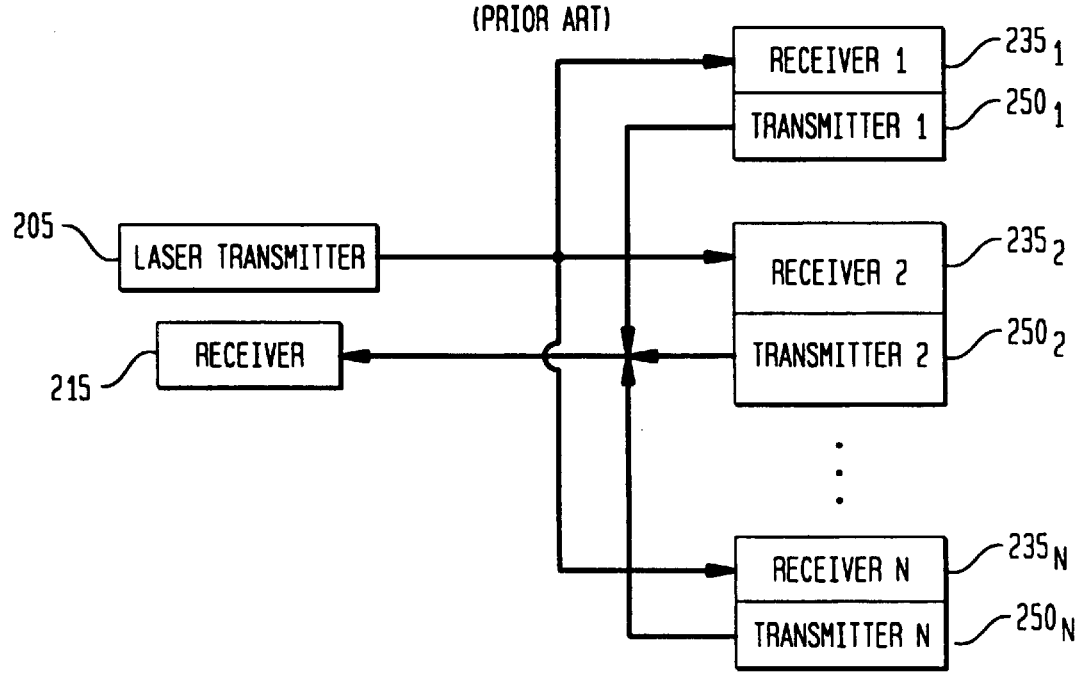
FIG. 2B illustrates a known passive optical network employing sub-carrier multiplexing.

Unlike the system of FIG. 2B, the interfering optical carrier is ≈20 dB weaker than the desired optical carrier (assuming ~10 dB optical loss along fiber 350) and it is only present at receiver 360 because Rayleigh back scattering in the fiber 350 reflects light from transmitter 370 into receiver 360. The present invention differs from the system of FIG. 2A because different optical carriers are employed—reducing the likelihood that there will be optical interference. Additionally, in FIG. 2A the interfering light is approximately 10 dB lower than the desired signal light at receiver 210 (again assuming a 10 dB loss in the optical fiber). Because of these differences the optical beat interference in the system of FIG. 2A is much larger and more predictable than the optical beat interference in the proposed system. The inventors discovered that this phenomenon can be obviated by assuring that the transmitters 370 and 370' have different optical spectra, mainly, that the characteristics of the transmitters are such as to assure that the wavelengths of transmission in the operational region will not overlap during the operation of the system.

In one embodiment, the optical spectral characteristics are made different by providing lasers 301 and 307 which provide different optical carrier wavelengths. For instance, laser 301 could provide an optical carrier signal on which the subcarriers would be modulated where the optical carrier would have the wavelength $\lambda_1$ equal to 1300 nm. Then, the optical carrier produced by laser 307 could be selected to be 1301 nm. This difference in wavelength is such that the characteristics of the optical spectra are sufficiently different (greater than 100 GHz) to insure that the wavelengths will not overlap during the operation of the two transceivers and that optical beat interference will not arise.

In this manner the present invention can provide bi-directional transmission over a single optical fiber with minimized concern for optical beat interference.

Of course, it is possible that as conditions change at either location I or location II, the laser optical carrier output may drift. For instance, it is known that lasers may produce optical carrier signals having different wavelengths depending on the temperatures to which the laser is subjected. Thus, in response to temperature drift, the wavelength of the optical carrier, produced, for example, by laser 301 at location I may drift toward the wavelength produced by laser 307 at location II. Therefore, if the differences in wavelengths are not defined to be an adequate amount, then it is possible that with certain temperature drifts an overlap condition might arise which might produce optical beat interference.

One solution to this problem is to provide temperature controllers at the locations at which the lasers are provided. The temperature controllers would insure that the occurrence of drift would be less likely.

Another solution is to choose $\lambda_1$ and $\lambda_2$ sufficiently different such that even with thermal drift the two wavelengths will not overlap. If laser 301 is a distributed feedback laser (DFB) with $\lambda_1$=1311 nm at room temperature and laser 307 is a DFB with $\lambda_2$=1300 nm at room temperature then the temperature at locations "I" and "II" can differ by 100° C. (semiconductor DFB lasers with $\lambda \approx$1300 nm tune approximately 0.1 nm/° C.).

An alternative embodiment of the present invention addresses this problem in a different manner without requiring temperature controllers. In particular, the same effect, that is, the reduction of the likelihood of the overlap of optical carrier wavelengths can be achieved by providing lasers at the different locations with different mode spacing characteristics.

It is known within the semiconductor laser art that the mode spacing characteristics of a Fabry-Perot laser, that is the difference between the wavelengths at which the device is likely to lase given certain phenomenon, differ depending upon the length of the resonant cavity of the laser. By selecting lasers for location I and location II which have in nearly all material respects the same characteristics except for the length of the resonant cavity it is possible to assure that the mode spacing characteristics of the two lasers will be different.

Figure 4A:
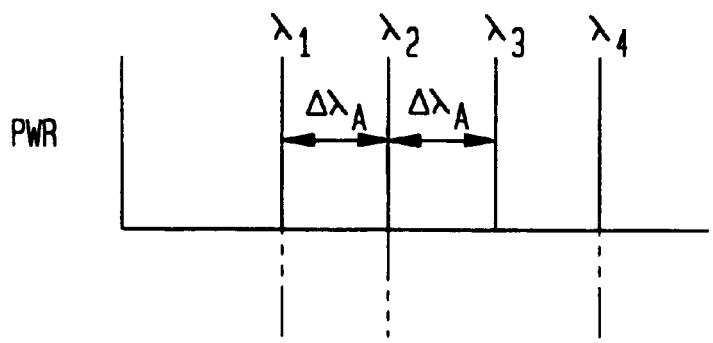
FIGS. 4A and 4B illustrate sample mode spacing arrangements employable in the embodiment of FIG. 3.
Figure 4B:
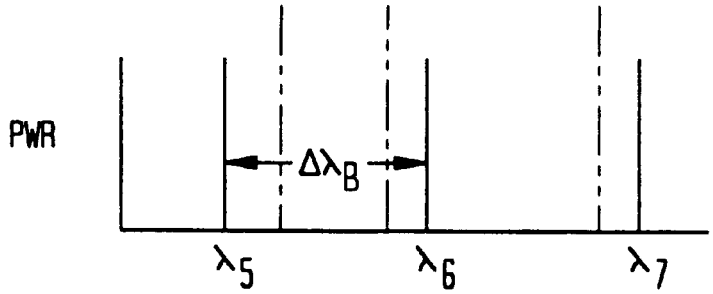

Examples of the mode spacing characteristics of lasers are shown in FIGS. 4A and 4B. In this example, the mode spacing characteristic in FIG. 4A corresponds to laser 301 and the mode spacing characteristic of FIG. 4B corresponds to laser 307. It is shown then that laser 301 may have four different wavelengths $\lambda_1-\lambda_4$ at which lasing occurs. By contrast, laser 307 has a different mode spacing characteristic which only permits lasing at wavelengths $\lambda_5-\lambda_7$. Though $\lambda_1-\lambda_4$ and $\lambda_5-\lambda_7$ may drift with temperature, the mode spacing of each of the lasers will remain relatively constant, therefore, even if $\lambda_2=\lambda_6$ the other wavelengths will differ. This in essence guarantees that the optical carriers of the two transmitters will be sufficiently different over the operation range of the system so as to reduce optical beat interference.

Though simply choosing unequal mode spacing in the two lasers should reduce the noise due to optical beat interference, to attain optimal performance the mode spacing of the two lasers should be chosen so that if one mode from one laser is aligned with a mode from the other, then ALL other modes will not be aligned. For example, if $\Delta\lambda_A$=0.8 nm and $\Delta\lambda_B$=2.4 nm then when $\lambda_{A,1}$ of laser A interferes with a $\lambda_{B,1}$ of laser B, other modes will also be aligned: $\lambda_A=\lambda_{A,1}+/-3\ \Delta\lambda_A$ will align with $\lambda_B=\lambda_{B,1}+\backslash -\Delta\lambda_B$. A better choice would be for $\Delta\lambda_A$=0.8 nm and $\Delta\lambda_B$=1.05 nm.

The chirp of the laser must also be considered in choosing the optimal mode spacing. When the laser is modulated, the chirp will broaden the individual modes of the laser. This implies that if the two lasers have modes with frequencies that differ by $f_2-f_1=\Delta f$ then when modulated those modes will have frequency components at $f_i+/-$chirp. In a single-mode laser large amounts of chirp will reduce the spectral noise density due to optical beat interference, which is advantageous in most cases (in cases where the bandwidth of the signals is less than the bandwidth of the noise). In the embodiment using multimode lasers large amounts of chirp will reduce the spectral noise density of the noise produced by the aligned modes, however, this must be weighed against the broadening of the other modes. The broadening of the modes must be taken into account when choosing the mode spacing, otherwise modes which are not aligned when the laser is not modulated will produce noise in the signal band when modulated.

By using multimode lasers with different mode spacing one can insure that not all the light in either laser contributes to the interference within the signal band. It is therefore advantageous to use multimode lasers which do not have a dominant mode. Therefore, in designing lasers for this system the fraction of optical power in the dominant mode should be minimized (i.e., lasers with many equal strength modes are better than lasers with few modes, or lasers with many modes which have the optical power primarily in just a few modes). In Fabry-Perot semiconductor lasers this design consideration leads to the choice of an active medium with a large gain-bandwidth so that many modes will have approximately equal gain, and therefore equal strength (current commercial devices employ strained-layer multiple-quantum-well active regions, and have a larger gain bandwidth than devices manufactured just a few years ago with bulk-active sections). Additionally, using lasers with smaller mode spacing is favored, as this enables more modes to fit within a given gain-bandwidth. In Fabry-Perot lasers the mode-spacing is set by the length of the laser cavity. In optimizing the length other factors must be considered, such as the laser threshold current, the laser chirp (as mentioned earlier, the laser chirp must be considered in choosing optimal mode spacing) and the laser cost.

By assuring that the optical spectral characteristics of the two transmitters in the bi-directional system are sufficiently different, it is possible to provide bi-directional transmission along a single optical fiber while avoiding or reducing optical beat interference.

This invention can also be employed in an environment where more than one location is involved. For instance, the embodiment is applicable to a mini-fiber-node (mFN) architecture (described in "Mini-fiber-node hybrid fiber coax networks for two-way broadband access" by Lu et al., OFC '96 Technical Digest, pp. 143–144) that uses one fiber for both upstream and downstream transmission and uses lasers with different optical spectral characteristics in the head end and the remote nodes. This mFN architecture is a fiber-to-the-curb overlay to a CATV (Cable TV) system. As an example, each node in the architecture might serve on the order of 30 homes. Employment of this invention would reduce the amount of fiber required.

Figure 5:
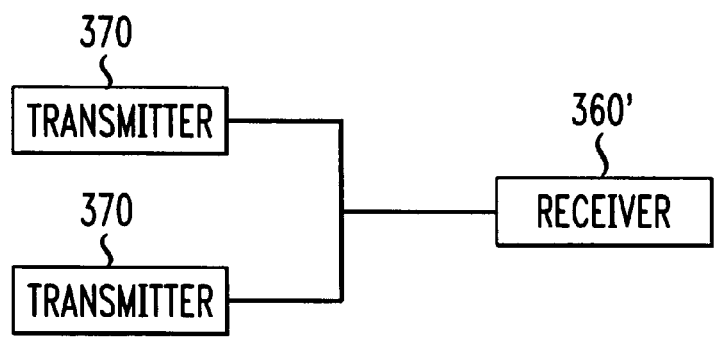
FIG. 5 illustrates a multiple source transmission system according to the invention.

The Applicants have also noted that the present invention is equally applicable in those configurations where multiple locations each having their own laser source are transmitting to the same receiver. In this configuration optical beat interference can also occur if each of the laser sources operates at the same optical carrier wavelength even though each of the optical carriers may be carrying different subcarrier signals. For instance, in a system where a first transmitter operates with an optical carrier $\lambda_1$ modulated with subcarriers $f_1$, $f_2$ and $f_3$ while a second transceiver has a laser also providing an optical carrier of $\lambda_1$ where the modulator signals are subcarriers $f_3$, $f_4$ and $f_5$, the same optical beat interference phenomenon can occur and disrupt transmissions even though different subcarriers are being employed. The present invention can be adapted to reduce the problem of optical beat interference in this configuration as well. In particular, as shown in FIG. 5 the two laser devices for the transmitters in this system could have different optical spectral characteristics to thereby avoid the optical beat interference problem. Just as in the bi-directional system described above, the optical spectral characteristic differences could be the result of providing lasers with different mode spacing.

In view of the arrangement of providing different optical spectral characteristics it is possible to avoid optical beat interference in those configurations in which previously there was a concern that drift might create overlapping wavelengths over a single optical fiber which would create interference between the signals traversing those fibers.

What is claimed is:

1. A bidirectional optical transmission system comprising:

an optical fiber;

a first transceiver coupled to said optical fiber and including a first transmitter providing an optical carrier signal in accordance with a first optical spectral characteristic and on which optical carrier signal at least one subcarrier can be modulated;

a first receiver;

a second transceiver coupled to said optical fiber and including a second transmitter providing a second optical carrier signal in accordance with a second optical spectral characteristic and on which second optical carrier signal at least one subcarrier can be modulated; and a second receiver;

wherein the frequency of said first optical carrier signal differs from the frequency of said second optical carrier signal by an amount greater than the maximum frequency of the subcarriers associated with said first and second optical carrier signals and by an additional amount to compensate for variations due to linewidth, chirp and drift.

2. The system of claim 1 wherein the frequency of said first optical carrier signal differs from the frequency of said second optical carrier signal by an amount greater than the maximum frequency of the subcarriers associated with said first and second optical carrier signals and an additional amount sufficient to preclude subcarrier frequency overlap caused by shifts in optical carrier frequency due to temperature variations, line noise, modulation of said first and second optical carrier signals, and frequency drift.

3. The system of claim 1 wherein the wavelength of said first optical carrier signal and the wavelength of said second optical carrier signal differ by at least 1 nm.

4. The system of claim 1 further comprising a temperature controller associated with said first transceiver.

5. A bidirectional optical transmission system comprising:

an optical fiber;

a first transceiver coupled to said optical fiber and including, a first transmitter providing an optical carrier signal in accordance with a first optical spectral characteristic corresponding to multiple modes with a first mode spacing and on which optical carrier signal at least one subcarrier can be modulated, and a first receiver;

a second transceiver coupled to said optical fiber and including, a second transmitter providing a second optical carrier signal in accordance with a second optical spectral characteristic corresponding to multiple modes with a second mode spacing and on which second optical carrier signal at least one subcarrier can be modulated, and a second receiver;

wherein said first mode spacing differs from said second mode spacing.

6. A system for bidirectional transmission along an optical fiber comprising:

a first transceiver to be coupled to the optical fiber and including a first laser that has a first optical spectral characteristic, and that provides a first optical carrier;

a first modulator coupled to said first laser and providing at lease one subcarrier to be applied to said first optical carrier, and a first receiver;

a second transceiver to be coupled to the optical fiber and including a second laser having a second optical spectral characteristic and that provides a second optical carrier signal;

a second modulator coupled to said second laser and providing at least one subcarrier to be applied to said second optical carrier; and a second receiver;

wherein the frequency of said first optical carrier signal differs from the frequency of said second optical carrier signal by an amount greater than the maximum frequency of the subcarriers associated with said first and second optical carrier signals and by an additional amount to compensate for variations due to linewidth, chirp and drift.

7. A system for bidirectional transmission along an optical fiber comprising:

a first transceiver to be coupled to the optical fiber and including, a first laser that has a first optical spectral characteristic, said first laser having in accordance with said first optical characteristic a first mode spacing and providing a first optical carrier, a first modulator coupled to said first laser and providing at lease one subcarrier to be applied to said first optical carrier, and a first receiver;

a second transceiver to be coupled to the optical fiber and including, a second laser having a second optical spectral characteristic, said second laser having in accordance with said second optical characteristic a second mode spacing and providing a second optical carrier signal, a second modulator coupled to said second laser and providing at least one subcarrier to be applied to said second optical carrier, and a second receiver;

wherein said first mode spacing differs from said second mode spacing.

8. A method for bidirectional transmission along an optical fiber, the method comprising the steps of:

at a first location;

producing a first optical carrier in accordance with a first optical spectral characteristic;

modulating at least one subcarrier on said first optical carrier;

coupling the modulated first optical carrier to the optical fiber; and receiving an optical signal from a second location;

at a second location:

producing a second optical carrier in accordance with a second optical spectral characteristic;

modulating at least one subcarrier on said second optical carrier;

receiving an optical signal from a first location;

wherein the frequency of said first optical carrier signal differs from the frequency of said second optical carrier signal by an amount greater than the maximum frequency of the subcarriers associated with said first and second optical carrier signals and by an additional amount to compensate for variations due to linewidth, chirp and drift.

9. A method for bidirectional transmission along an optical fiber, the method comprising the steps of:
- at a first location,
  - producing a first optical carrier in accordance with a first optical spectral characteristic corresponding to a first mode spacing, and
  - modulating at least one subcarrier on said first optical carrier,
  - coupling the modulated first optical carrier to the optical fiber, and
  - receiving an optical signal from a second location;
- at a second location,
  - producing a second optical carrier in accordance with a second optical spectral characteristic corresponding to a second mode spacing, and
  - modulating at least one subcarrier on said second optical carrier,
  - coupling the modulated second optical carrier to the optical fiber, and
  - receiving an optical signal from a first location;

wherein said second mode spacing is different from said first mode spacing.

10. A multiple source optical transmission system comprising:
- a first transmitter providing an optical carrier signal in accordance with a first mode spacing characteristic and on which at least one sub-carrier's signal can be modulated;
- a second transmitter providing another optical carrier signal in accordance with a second mode spacing characteristic and on which at least one sub-carrier's signal can be modulated; and
- a receiver that receives outputs of both said first transmitter and said second transmitter;

wherein said first mode spacing characteristic differs from said second mode spacing characteristic.

* * * * *